United States Patent
Hamid

(10) Patent No.: US 8,555,376 B2
(45) Date of Patent: Oct. 8, 2013

(54) METHOD AND SYSTEM FOR SUPPORTING PORTABLE DESKTOP WITH ENHANCED FUNCTIONALITY

(75) Inventor: Laurence Hamid, Ottawa (CA)

(73) Assignee: Imation Corp., Oakdale, MN (US)

( * ) Notice: Subject to any disclaimer, the term of this patent is extended or adjusted under 35 U.S.C. 154(b) by 728 days.

(21) Appl. No.: 12/570,706

(22) Filed: Sep. 30, 2009

(65) Prior Publication Data

US 2011/0078785 A1    Mar. 31, 2011

(51) Int. Cl.
   *G06F 7/04*    (2006.01)
   *G06F 12/00*   (2006.01)
   *G06F 12/14*   (2006.01)
   *G06F 13/00*   (2006.01)
   *G06F 17/30*   (2006.01)
   *G11C 7/00*    (2006.01)

(52) U.S. Cl.
   USPC .......................................................... 726/17

(58) Field of Classification Search
   USPC ................................................. 726/17, 4, 27
   See application file for complete search history.

(56) References Cited

U.S. PATENT DOCUMENTS

| | | | |
|---|---|---|---|
| 6,249,868 B1 | 6/2001 | Sherman et al. | |
| 6,321,335 B1 | 11/2001 | Chu | |
| 6,370,649 B1 | 4/2002 | Angelo et al. | |
| 6,718,463 B1 | 4/2004 | Malik | |
| 6,754,817 B2 | 6/2004 | Khatri et al. | |
| 7,069,433 B1 | 6/2006 | Henry et al. | |
| 7,293,166 B2 | 11/2007 | Nguyen et al. | |
| 7,363,363 B2 | 4/2008 | Dal Canto et al. | |
| 7,484,089 B1 | 1/2009 | Kogen et al. | |
| 7,555,568 B2 | 6/2009 | Huang | |
| 7,865,573 B2 | 1/2011 | Tyhurst et al. | |
| 7,975,287 B2 | 7/2011 | Hung | |
| 8,024,790 B2 | 9/2011 | Zhao et al. | |
| 8,065,676 B1 | 11/2011 | Sahai et al. | |
| 8,104,088 B2 | 1/2012 | Khilnani et al. | |
| 8,140,869 B2 | 3/2012 | Song et al. | |
| 8,176,153 B2 | 5/2012 | Bose | |
| 2002/0087877 A1 | 7/2002 | Grawrock | |
| 2002/0188565 A1 | 12/2002 | Nakamura et al. | |
| 2003/0101246 A1 | 5/2003 | Lahti | |

(Continued)

FOREIGN PATENT DOCUMENTS

| | | |
|---|---|---|
| EP | 1 168 235 A2 | 1/2002 |
| GB | 2 420 198 A | 5/2006 |

(Continued)

OTHER PUBLICATIONS

Kevin. "Review: IronKey Secure USB Flash Drive," Oct. 3, 2007, p. 1-5. Retrieved from the Internet: <URL: http://www.geek.com/articles/gadgets/review-ironkey-secure-usb-flash-drive-2007103/> retrieved on Nov. 15, 2012.

*Primary Examiner* — Kambiz Zand
*Assistant Examiner* — Dant Shaifer Harriman
(74) *Attorney, Agent, or Firm* — Kenneth E. Levitt; Dorsey & Whitney LLP

(57) ABSTRACT

A method is disclosed for a peripheral portable desktop device. The peripheral portable desktop device is coupled with a workstation. In a second mode of operation, a portion of the peripheral portable desktop device is operatively coupled with the workstation for operation therewith to provide an ancillary function. In a first mode of operation data within the peripheral portable desktop device is used to support a personal desktop on the workstation.

21 Claims, 5 Drawing Sheets

(56) References Cited

U.S. PATENT DOCUMENTS

| | | |
|---|---|---|
| 2003/0195950 A1 | 10/2003 | Huang et al. |
| 2003/0216136 A1 | 11/2003 | McBreaty et al. |
| 2004/0019778 A1 | 1/2004 | Gere |
| 2004/0095382 A1 | 5/2004 | Fisher et al. |
| 2004/0103288 A1 | 5/2004 | Ziv et al. |
| 2005/0193188 A1 | 9/2005 | Huang |
| 2005/0235045 A1 | 10/2005 | Narayanaswami et al. |
| 2006/0080540 A1 | 4/2006 | Arnon et al. |
| 2006/0085845 A1 | 4/2006 | Davis et al. |
| 2006/0130004 A1 | 6/2006 | Hughes et al. |
| 2006/0200679 A1 | 9/2006 | Hawk et al. |
| 2007/0016743 A1 | 1/2007 | Jevans |
| 2007/0101118 A1 | 5/2007 | Raghunath et al. |
| 2007/0143837 A1 | 6/2007 | Azeez et al. |
| 2007/0300220 A1 | 12/2007 | Seliger et al. |
| 2008/0016005 A1 | 1/2008 | Owen et al. |
| 2008/0022393 A1 | 1/2008 | Waltermann et al. |
| 2008/0052528 A1 | 2/2008 | Poo et al. |
| 2008/0052770 A1 * | 2/2008 | Ali et al. ............................ 726/9 |
| 2008/0052776 A1 | 2/2008 | Prabhat et al. |
| 2008/0172555 A1 | 7/2008 | Keenan |
| 2008/0215796 A1 | 9/2008 | Lam et al. |
| 2008/0293450 A1 | 11/2008 | Ryan et al. |
| 2009/0132816 A1 | 5/2009 | Lee |
| 2009/0210794 A1 | 8/2009 | Pendse et al. |
| 2009/0260071 A1 | 10/2009 | Sadovsky et al. |
| 2009/0300710 A1 | 12/2009 | Chai et al. |
| 2009/0319782 A1 * | 12/2009 | Lee ................................ 713/156 |
| 2010/0036973 A1 | 2/2010 | Mardiks et al. |
| 2010/0251328 A1 | 9/2010 | Syed et al. |
| 2011/0078347 A1 | 3/2011 | Hamid |
| 2011/0078428 A1 | 3/2011 | Hamid |
| 2011/0078787 A1 | 3/2011 | Hamid |

FOREIGN PATENT DOCUMENTS

| | | |
|---|---|---|
| WO | WO 98/04967 A1 | 2/1998 |
| WO | WO 2008/122755 A1 | 10/2008 |
| WO | WO 2011/038502 | 4/2011 |
| WO | WO 2011/038503 | 4/2011 |
| WO | WO 2011/038504 | 4/2011 |
| WO | WO 2011/038505 | 4/2011 |
| WO | WO 2011/057409 | 5/2011 |

* cited by examiner

METHOD AND SYSTEM FOR SUPPORTING PORTABLE DESKTOP WITH ENHANCED FUNCTIONALITY

FIELD OF THE INVENTION

The present invention generally relates to the field of data processing systems and networks and more particularly to a method and system for using a portable peripheral memory storage device to implement secure and portable personalized desktop functionality.

BACKGROUND

The concept of a portable desktop is well known in the field of data processing systems and data processing networks. A portable desktop generally refers to personal desktop that a user can recreate on any of a number of computers, for example connected to a network. Implied by the term personal desktop is the private data associated with each user including, for example, email, appointments, personal files, and the like. By enabling users to use a greater number of devices without sacrificing the benefits of a familiar and personalized interface, portable desktops have the potential to expand mobility and convenience, greatly. Typically, portable desktops are achieved by storing within a network a personalized file system or directory for each user. In order to enable a user's desktop, files and home directory to be portable, the user's file system or disk is networked within the network. This model, unfortunately, can lead to security lapses in which, for example, a root system administrator snoops and reads a user's personal email, files, etc.

One attempt to address this problem contemplates distributing a personal data device drive to each user. The user's personal directory is stored on the personal drive. When the user connects to the network using a particular computer, the personal drive is inserted into an appropriate slot of the machine. After "hot plugging" the drive into the machine, a network workstation mounts the personal directory on the personal drive and provides a personalized interface to the user. It will be appreciated, however, that the cost and inconvenience associated with requiring users to perform field installs and disk drive configurations every time they wish to access their portable disks makes this solution impractical. Further, the software for each computer supporting the personal desktop application is custom and therefore limits use of the personal desktop and all data associated therewith.

It would be desirable, therefore, to provide a system and method supporting benefits of personalized and portable desktops without sacrificing security and without incurring the cost and inconvenience of the prior art.

SUMMARY OF EMBODIMENTS OF THE INVENTION

In accordance with the invention there is provided a peripheral portable desktop device comprising: a housing; a port for interfacing with a workstation; a first circuit comprising a memory comprising portable desktop data and for supporting of portable desktop functionality on a workstation coupled thereto; and a second circuit for providing an ancillary function, the ancillary function for use independent of the portable desktop, the peripheral portable desktop device for providing a portable desktop environment in a first mode of operation and the ancillary function absent a portable desktop environment in a second other mode of operation.

In accordance with another aspect of the invention there is provided a method comprising: coupling a peripheral portable desktop device with a workstation; in a first mode of operation using data within the peripheral portable desktop device to support a personal desktop on the workstation; and in a second other mode of operation, providing an ancillary function, the ancillary function provided outside the personal desktop environment.

In accordance with another embodiment of the invention there is provided a method comprising: coupling a peripheral portable desktop device with a workstation; in a first mode of operation using a user authentication function to provide access to data within the peripheral portable desktop device to support a personal desktop on the workstation; and in a second other mode of operation, providing the user authentication function, the user authentication function provided outside the personal desktop environment.

BRIEF DESCRIPTION OF THE DRAWINGS

Other objects and advantages of the invention will become apparent upon reading the following detailed description and upon reference to the accompanying drawings in which.

DETAILED DESCRIPTION OF EMBODIMENTS OF THE INVENTION

Figure 1A:
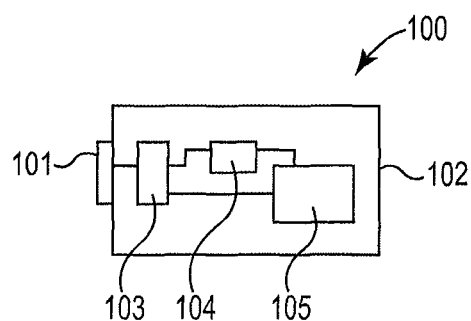
FIG. 1a is a simplified block diagram of a portable peripheral memory storage device in the form of a universal serial bus (USB) memory key.

Referring to FIG. 1a, shown is a prior art portable peripheral memory storage device 100. The device comprises a USB connector 101 and a housing 102. When the USB connector 101 is coupled to a mating connector on a host computer in the form of a personal computer (not shown), data is exchanged between the portable peripheral memory storage device 100 and the host computer. The USB communication circuit 103 communicates with another USB communication circuit within the host computer. The USB communication circuit 103 further communicates with processor 104 in the form of a microcontroller. The processor in turn communicates with static random access memory (static RAM) 105 within the portable peripheral memory storage device 100.

When powered on, the prior art peripheral memory storage device commences interactions with a host computer system from which it draws power. The interactions allow the host computer system to mount the portable peripheral memory storage device 100 for access as a memory storage device by the host computer system. Thus, the portable peripheral memory storage device 100, for example, appears as a storage device listed with other storage devices of the host computer. It is known to then store data on or retrieve data from the portable peripheral memory storage device 100. Removing the portable peripheral memory storage device 100 from the host computer system allows for portability of any of the data stored therein to another host computer either locally or wherever the portable peripheral memory storage device 100 is taken.

Figure 1B:
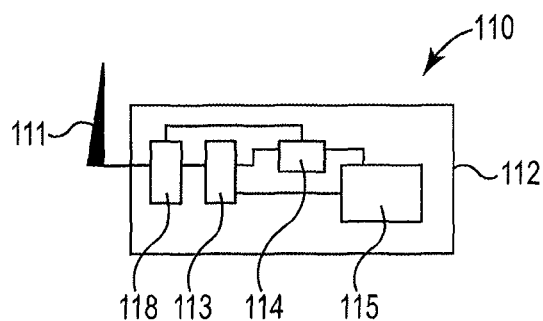
FIG. 1b is a simplified block diagram of a portable peripheral memory storage device in the form of a wireless memory key.

Referring to FIG. 1b, shown is a prior art portable peripheral memory storage device 110. The device comprises an antenna 111 and a housing 112. When the portable peripheral memory storage device 110 is wirelessly coupled to a host computer in the form of a personal computer (not shown), data is exchangeable between the portable peripheral memory storage device 110 and the host computer. A transceiver circuit 118 present within the housing 112 converts data into amplified signals for driving the antenna 111. A communication circuit 113 communicates with another communication circuit within the host computer via the wireless communication link formed therebetween. The communication circuit 113 further communicates with processor 114 in the form of a microcontroller. The processor 114 in turn communicates with static random access memory (static RAM) 115 within the portable peripheral memory storage device 110.

Once wirelessly coupled to a host computer, the prior art portable peripheral memory storage device commences interactions with the host computer system. The interactions allow the host computer system to mount the portable peripheral memory storage device 110 for access as a memory storage device by the host computer system. Thus, the portable peripheral memory storage device 110, for example, appears as a storage device listed with other storage devices of the host computer. It is known to then store data on or retrieve data from the portable peripheral memory storage device 110. Moving the portable peripheral memory storage device 110 allows for portability of any of the data stored therein to another host computer either locally or wherever the portable peripheral memory storage device 110 is taken.

Figure 2:
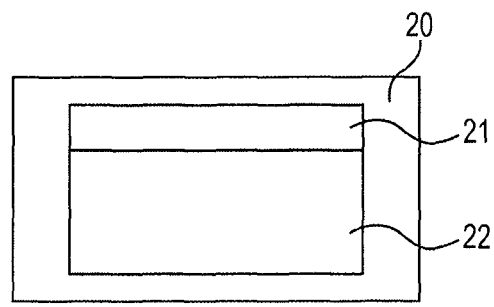
FIG. 2 is a simplified memory diagram for a prior art portable peripheral memory storage device.

Referring to FIG. 2, it is further known to secure data within the portable peripheral memory storage device of FIG. 1a and of FIG. 1b and to require user authentication in order to access same. In such a portable peripheral memory storage device, a user is prompted to provide user authentication data, either to the host computer or to the peripheral memory storage device itself in order to "unlock" the data stored within the peripheral memory storage device. For example, a peripheral memory storage device comprising a fingerprint scanner requires a user to provide a live fingerprint thereto before releasing data stored therein. As shown in FIG. 2, a memory space 20 includes a peripheral memory storage area 22 and a security data storage area 21. Data stored within the security data storage area is for securing the data stored within the peripheral memory storage area. For example, this area includes processes for execution by a controller within the portable peripheral memory storage device for securing and de-securing of data. Optionally, this area includes correlation data for being correlated with user provided security data or information.

The peripheral memory storage area 22 comprises static RAM and effectively appears as the mounted storage area within an operating system of the host system.

Figure 3:
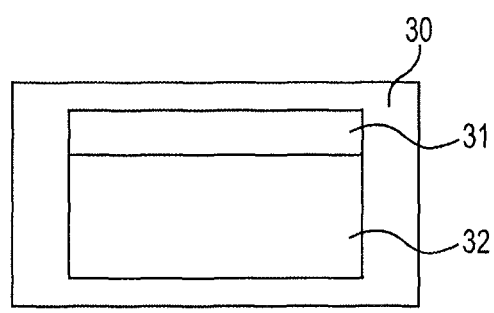
FIG. 3 is a simplified memory diagram for a prior art portable peripheral memory storage device supporting virtualisation of a desktop.

Referring to FIG. 3, it is further known to secure data within the portable peripheral memory storage device of FIG. 1a and of FIG. 1b and to require user authentication in order to access same. In such a portable peripheral memory storage device, a user is prompted to provide user authentication data, either to the host computer or to the peripheral memory storage device itself in order to "unlock" the data stored within the peripheral memory storage device. For example, a peripheral memory storage device comprising a fingerprint scanner requires a user to provide a live fingerprint thereto before releasing data stored therein. As shown in FIG. 3, a memory space 30 includes a peripheral memory storage area 32 and a security data storage area 31. Data stored within the security data storage area is for securing the data stored within the peripheral memory storage area. For example, this area includes processes for execution by a controller within the portable peripheral memory storage device for securing and de-securing of data. Optionally, this area includes correlation data for being correlated with user provided security data or information.

The peripheral memory storage area 32 comprises static RAM for having data relating to a personalized desktop stored therein for use with a host system in providing the user with portable desktop functionality. The data stored therein is modified and updated by the portable desktop application.

Generally speaking an embodiment of the present invention contemplates a system that enables personalized desktop functionality provided via a peripheral portable desktop device while supporting other functions of the peripheral portable desktop device.

Figure 4:
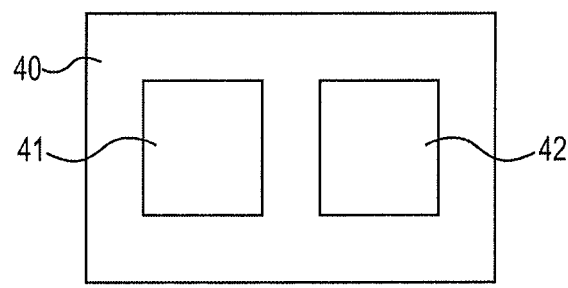
FIG. 4 is a simplified memory diagram for a peripheral portable desktop device according to an embodiment of the invention wherein the device supports an ancillary function.

Referring to FIG. 4, a block diagram of an exemplary device is shown. In such a portable peripheral memory storage device, a user is prompted to provide user authentication data, either to the host computer or to the peripheral portable desktop device itself in order to "unlock" the peripheral portable desktop device. For example, a peripheral portable desktop device comprising a fingerprint scanner requires a user to provide a live fingerprint thereto before releasing data stored therein. As shown in FIG. 4, a memory space 40 includes peripheral portable desktop data storage area 42 and a security data storage area 41. Data stored within the security data storage area is for securing the data stored within the peripheral memory storage area. For example, this area includes processes for execution by a controller within the peripheral portable desktop device for securing and de-securing of data. Optionally, this area includes correlation data for being correlated with user provided security data or information.

The peripheral memory storage area 42 comprises static RAM for having data relating to a personalized desktop stored therein for use with a host system in providing the user with portable desktop functionality. The data stored therein is modified and updated by the portable desktop application. Thus, the peripheral portable desktop device optionally includes circuitry for executing functions thereof such as cache management, memory use optimization, security functions, and communication functions.

Of note, the peripheral portable desktop device comprises two separate functions, a security function and a portable desktop function. Optionally, the security function is usable within and outside of the portable desktop environment.

Thus, the peripheral portable desktop device is operable in either of two modes of operation. In a first mode of operation, the device supports portable desktop functionality. In a second other mode of operation the peripheral portable desktop device supports an ancillary function in the form of a user authentication function. Optionally, the authentication function comprises a key escrow function for providing keys and passwords as needed by an authenticated user of the device. When the peripheral portable desktop device is usable within the portable desktop environment for authentication functions, it appears within the portable desktop as a device similar to its appearance when used outside the portable desktop environment. Alternatively, its use and appearance is different.

For example, in the portable desktop environment, the authentication functions are included and access these functions directly. That said, even when this is the case, the authentication device interface—what the user sees—optionally is consistent across environments. Alternatively, the portable desktop mounts the device through a process outside the portable desktop and has a software hook to communicate with the device.

Figure 5:
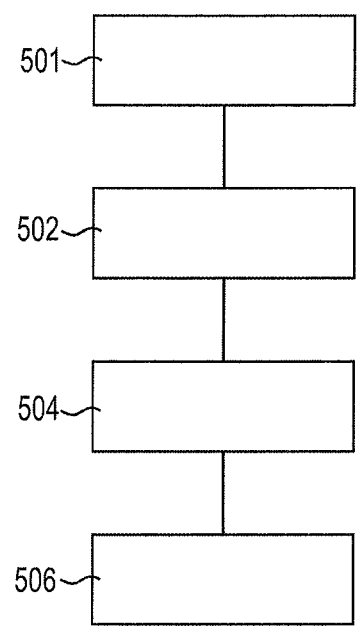
FIG. 5 is a simplified flow diagram for a peripheral portable desktop device according to an embodiment of an embodiment of the invention when operating for providing an ancillary function.

Referring to FIG. 5, shown is a simplified flow diagram of a method of providing a virtual desktop. At 501, a first user is provided with a peripheral portable desktop device in the form of a universal serial bus (USB) memory key comprising memory storage therein for coupling to a USB port of a host computer system. The peripheral portable desktop device has data stored therein for supporting the portable desktop of the first user, for example by having stored thereon the user's personal directory containing personal data/files including, for example, email, appointments, desktop files and the like. The peripheral portable desktop device is preferably sufficiently small to enable users to clip it to their clothing or otherwise carry it on themselves in the same way that they might have a cellular telephone or a wireless paging device. Peripheral memory storage devices of this nature are well known and presently are offered in numerous small form factors many of which will fit in a change purse. Larger peripheral memory storage devices comprise hard drives, but even these are generally of a size and form factor for easy portability.

The peripheral portable desktop device is coupled with a host computer during use thereof at 502. Typically, this is performed by inserting the USB connector of the peripheral portable desktop device into a mating connector of the host computer. Alternatively, another method of coupling in the form of wireless coupling is used. Further alternatively, yet another coupling process is employed.

Because the host computer system is in use, at 504 an ancillary function of the peripheral portable desktop device is accessed in the form of an authentication function. Optionally, a user of the peripheral portable desktop device is provided an indication of availability of said ancillary function within an operating system of the host computer system. The first user is then able to, at 506, use the ancillary function within the present environment. For example, the user could use an authentication and key escrow function to access a remote system or a software package or data within the host computer system. The first user, however, is barred from accessing any data within their portable desktop.

Figure 6:
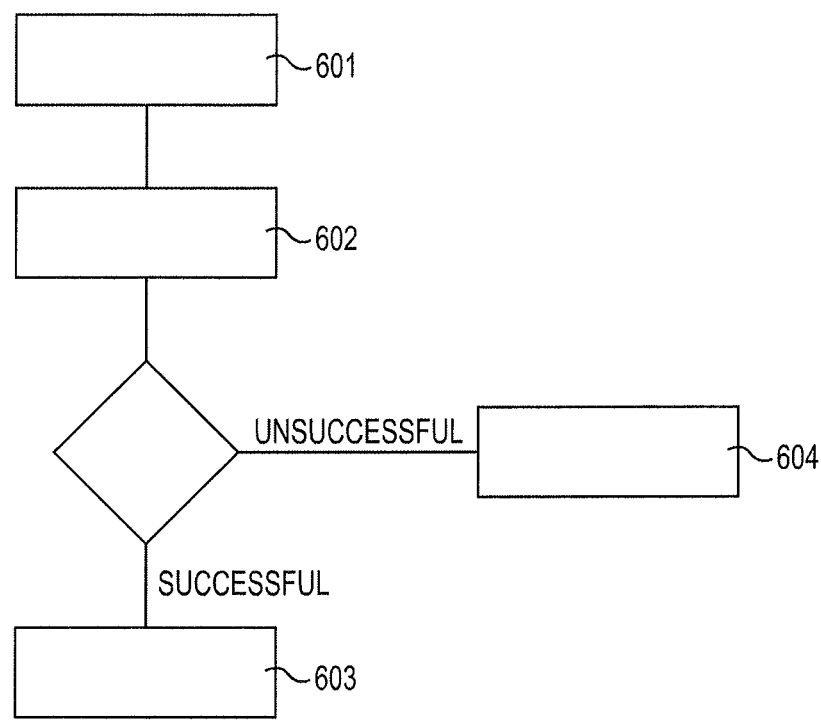
FIG. 6 is a simplified flow diagram for a peripheral portable desktop device according to an embodiment of an embodiment of the invention when operating for providing a virtual desktop; and, FIG. 7 is a simplified flow diagram for a peripheral portable desktop device according to an embodiment of an embodiment of the invention when operating for providing a virtual desktop and an ancillary function therein.

Referring to FIG. 6, when the host computer is rebooted at 601, the peripheral portable desktop device is detected at boot-up and at 602 the first user is authenticated to the device. When authentication is successful, at 603 the host computer executes the personal desktop of the first user based on memory within the peripheral portable desktop device. The personal desktop denies the first user access to the ancillary function in the form of an authentication function. Here, the authentication function is relied upon at 602 to provide access to the portable desktop but is unnecessary thereafter. When authentication is other than successful, the device denies access to its content and optionally to ancillary functions thereon.

Optionally, the portable desktop environment supports the ancillary function separately within its own operations and thereby does not need to provide access to the ancillary function via the secondary functionality of the peripheral portable desktop device.

Figure 7:
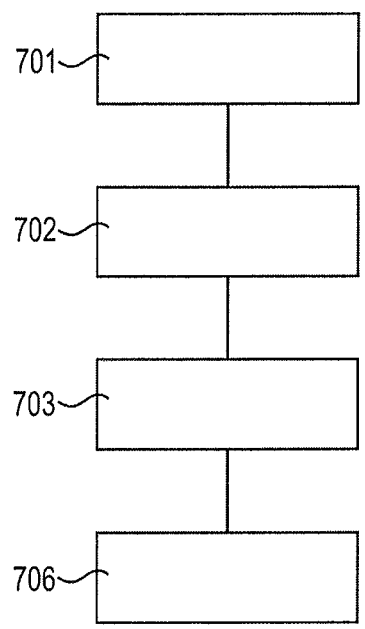

Referring to FIG. 7, an alternative embodiment is shown. When the host computer is rebooted at 701, the peripheral portable desktop device is detected at boot-up and at 702 causes the host computer to execute the personal desktop of the first user based on memory within the peripheral portable desktop device. At 703, the personal desktop engages the ancillary function of the peripheral portable desktop device. Thus, the peripheral portable desktop device is usable as a personal desktop device and as a device supporting the ancillary function. At 706, the first user uses the ancillary function from within the portable desktop environment.

Numerous other embodiments may be envisaged without departing from the spirit or scope of the invention.

What is claimed is:

1. A peripheral portable desktop device comprising:
   a housing;
   a port for interfacing with a workstation;
   a first circuit comprising a peripheral portable desktop memory storage area comprising portable desktop data and configured for supporting portable desktop functionality in a portable desktop environment in a first mode of operation on the workstation, wherein the peripheral portable desktop device is coupled thereto; and
   a second circuit comprising a security data storage area for securing the portable desktop data in the peripheral portable desktop storage area and further providing an ancillary authentication function, the ancillary authentication function for use independent of the portable desktop functionality in a second other mode of operation, absent the portable desktop environment;
   wherein the peripheral portable desktop device is configured for providing the portable desktop environment in the first mode of operation and the ancillary authentication function absent the portable desktop environment in the second other mode of operation; and
   a processor configured for providing limited access to the second circuit when the device is operating in the first mode to provide the portable desktop environment, the limited access restricting access to the ancillary authentication function provided by the second circuit in the portable desktop environment, relative to such access provided in the second other mode of operation, absent the portable desktop environment.

2. A peripheral portable desktop device according to claim 1 wherein the port comprises a universal serial bus (USB) port.

3. A peripheral portable desktop device according to claim 1 wherein the housing is sized and configured for fitting within the clothing of an individual.

4. A peripheral portable desktop device according to claim 1, the processor further for preventing access to the first circuit unless the device is operating to provide the portable desktop environment.

5. A peripheral portable desktop device according to claim 4, the processor further for providing the limited access to the second circuit when the device is operating to provide the portable desktop environment.

6. A peripheral portable desktop device according to claim 4, the processor further for providing access to the second circuit when the device is other than operating to provide the portable desktop environment.

7. A peripheral portable desktop device according to claim 1, the processor further for preventing access to both the first and second circuits absent prior user authentication.

8. A peripheral portable desktop device according to claim 1 wherein the ancillary function comprises a user authentication function and wherein user authentication by the ancillary function is required prior to execution of the portable desktop.

9. A method comprising:
coupling a peripheral portable desktop device with a host computer;
executing a process included within a security data storage area of the peripheral portable desktop device, wherein the process secures portable desktop data within a peripheral portable desktop storage area of the peripheral portable desktop device;
in a first mode of operation, using the portable desktop data within the peripheral portable desktop storage area of the peripheral portable desktop device to support a personal desktop environment providing portable desktop functionality on the host computer;
in a second other mode of operation, providing an ancillary authentication function, the ancillary authentication function provided independent of the portable desktop functionality and outside the personal desktop environment; and
providing limited access to the ancillary authentication function in the first mode of operation, the limited access restricting access to the ancillary authentication function in the portable desktop environment, relative to such access provided in the second mode of operation, outside the portable desktop environment.

10. A method according to claim 9 wherein in the second mode of operation, the ancillary function comprises a security function.

11. A method according to claim 10 wherein the ancillary function comprises a ciphering function.

12. A method according to claim 9 wherein in the second mode of operation, the ancillary function comprises other than a security function.

13. A method according to claim 11 wherein in the first mode of operation, the ancillary function is available with the limited access within the portable desktop environment.

14. A method according to claim 9 wherein the data within the peripheral portable desktop device to support the personal desktop environment is inaccessible in the second other mode of operation.

15. A method according to claim 9 wherein the data within the peripheral portable desktop device to support the personal desktop environment is hidden from a user of the peripheral portable desktop device in the second other mode of operation.

16. A method according to claim 9 wherein the peripheral portable desktop device operates within the first mode of operation when installed prior to booting the host computer and in the second other mode of operation when installed within a host computer that is already booted.

17. A method according to claim 16 wherein when installed prior to booting of the host computer the host computer boots from the peripheral portable desktop device, the host computer having non-volatile memory storage other than that of the peripheral portable desktop device disabled.

18. A method according to claim 9 comprising:
providing user authentication data to the peripheral portable desktop device;
when the user authentication data is indicative of other than an authorized user, denying access to data stored within the peripheral portable desktop device; and,
when the user authentication data is indicative of an authorized user, providing access to data stored within the peripheral portable desktop device.

19. A method according to claim 18 comprising:
when the user authentication data is indicative of other than an authorized user, denying access to the ancillary function; and,
when the user authentication data is indicative of an authorized user, providing access to the ancillary function.

20. A method comprising:
coupling a peripheral portable desktop device with a workstation;
securing portable desktop data within a peripheral portable desktop storage area of the peripheral portable desktop device;
in a first mode of operation, using an auxiliary user authentication function to provide access to the portable desktop data within the peripheral portable desktop storage area of the peripheral portable desktop device, in order to support a personal desktop environment providing portable desktop functionality on the workstation;
in a second other mode of operation, providing access to the ancillary user authentication function, wherein the ancillary user authentication function is provided independent of the portable desktop functionality and outside the personal desktop environment; and
limiting access to the ancillary user authentication function when the device is operating in the first mode of operation to provide the portable desktop environment, the limited access restricting access to the ancillary user authentication function in the portable desktop environment, relative to such access provided in the second mode of operation, outside the portable desktop environment.

21. The method of claim 20, wherein the peripheral portable desktop device operates in the first mode of operation when installed prior to booting the workstation and in the second other mode of operation when installed on a workstation that is already booted.

* * * * *